M. S. FOUTCH.
BEET HARVESTING AND TOPPING MACHINE.
APPLICATION FILED MAR. 24, 1913.

1,099,978.

Patented June 16, 1914.
7 SHEETS—SHEET 1.

Fig. 1.

Witnesses

Inventor
M. S. Foutch.

By

Attorney

M. S. FOUTCH.
BEET HARVESTING AND TOPPING MACHINE.
APPLICATION FILED MAR. 24, 1913.

1,099,978.

Patented June 16, 1914.

M. S. FOUTCH.
BEET HARVESTING AND TOPPING MACHINE.
APPLICATION FILED MAR. 24, 1913.

1,099,978.

Patented June 16, 1914.
7 SHEETS—SHEET 3.

M. S. FOUTCH.
BEET HARVESTING AND TOPPING MACHINE.
APPLICATION FILED MAR. 24, 1913.

1,099,978.

Patented June 16, 1914.

M. S. FOUTCH.
BEET HARVESTING AND TOPPING MACHINE.
APPLICATION FILED MAR. 24, 1913.

1,099,978.

Patented June 16, 1914.
7 SHEETS—SHEET 6.

M. S. FOUTCH.
BEET HARVESTING AND TOPPING MACHINE.
APPLICATION FILED MAR. 24, 1913.

1,099,978.

Patented June 16, 1914.

UNITED STATES PATENT OFFICE.

MILLARD S. FOUTCH, OF KEARNEY, NEBRASKA.

BEET HARVESTING AND TOPPING MACHINE.

1,099,978.  Specification of Letters Patent.  Patented June 16, 1914.

Application filed March 24, 1913. Serial No. 756,576.

*To all whom it may concern:*

Be it known that I, MILLARD S. FOUTCH, a citizen of the United States, residing at Kearney, in the county of Buffalo and State of Nebraska, have invented certain new and useful Improvements in Beet Harvesting and Topping Machines, of which the following is a specification.

This invention relates to beet harvesting and topping machines, and has for its object, generally stated, the provision of an apparatus which may be drawn over a field and during its travel will uncover and take up the beets, then sever the tops from the beets, and deliver the beets and the tops into separate receptacles.

A further object of the invention is to provide means by which the dirt will be removed from the beets as the machine is drawn along the row so that the uncovered beets will be subsequently taken up by uprooting mechanism practically free of soil.

A further object of the invention is to provide novel means for engaging the beets as the machine is drawn over the field and delivering the beets to the topping mechanism.

A further object of the invention is to provide novel means for separating the beet tops from the beet bodies and conveying the separated bodies and tops to different receptacles.

A further object of the invention is to provide means for adjusting the several parts to meet various conditions, and, finally, the object of the invention is to improve the construction and operation, generally, to the end that the efficiency and durability of the machine may be increased.

These stated objects, and such other objects as will incidentally appear from the following description, are attained in a mechanism of the type illustrated in the accompanying drawings, and the invention consists in certain novel features which will be particularly pointed out in the claims following the description.

The accompanying drawings show what I now consider to be the best embodiment of my invention, and in the said drawings.

In carrying out my invention, I employ a main frame which may be of any desired construction and is illustrated as consisting of upper and lower side beams 1 and vertical posts or standards 2 connecting said side beams at intervals. A bracket 3 is secured upon the upper side beams and extends transversely of the machine to support a driver's seat 4, and a platform 5 is provided at the front end of the frame and is supported by the front posts 2 and the intermediate posts nearest the said front posts, short supplemental beams or braces 6 being secured to and extended between the said posts at the side edges of the platform so as to additionally support the same. The front end of the main frame is supported upon wheels 7 mounted upon an axle 8 which is connected in any convenient manner to a king bolt 9 which rises through the upper and lower transverse beams or sills 10 of the frame. A pole or tongue 11 is connected to the axle 8 to provide means whereby the machine may be drawn over the field and steered. The rear portion of the main frame is supported upon wheels 12 which are carried by the lower ends of an arched axle 13, said axle being slidably mounted in bearings 14 on the side of the frame and extending above and over the frame, as shown. The wheels 7 and 12 will, of course, be set upon their axles at a greater or less distance apart according to the width of the rows. Standards 15 are secured to the main frame adjacent the bearings 14 and are provided with rearwardly projecting offsets 16 upon which is fulcrumed the adjusting lever 17, as shown. The said adjusting lever 17 is preferably in the form of a bail having lever arms disposed on both sides of the main frame and fulcrumed to the offsets 16 and a cross bar 18 connecting the upper ends of the lever arms. Short forwardly projecting arms 19 extend from the fulcrums of the levers and engage eyes 20 on the arched axle 13 so that when the adjusting lever is vibrated the arched axle will be raised or lowered and, consequently, the frame will be supported at a greater or less distance from the surface of the ground. When the lever is swung forward to its greatest extent, the several operating instrumentalities will be supported free of the ground so that the machine may then be drawn over a road or moved into a barn or storehouse without the mechanism operating. A holding bar or rack 21 is provided at each side of the main frame to engage the side arms of the adjusting lever and hold the same in a set position.

Journaled in the lower side bars of the main frame and extending transversely of the machine is a crank shaft 22 preferably disposed substantially in the vertical plane of the driver's seat. Loosely hung upon the crank portion of this shaft are suspending rods or hangers 23 having their lower ends attached to the upper edges of scoops or shovels 24 which are curved inwardly toward the central longitudinal plane of the apparatus and are adapted to take into the earth at the sides of the row of plants and thereby scoop out a furrow in which the beet-engaging fingers may travel. The lower inner extremities of these scoops or furrow-forming shovels are connected with plows 25 which are disposed longitudinally of the machine and have their front ends projected slightly in advance of the front edges of the scoops. Supporting bars or beams 26 are secured to the upper edges of the shovels 24 and extend forwardly therefrom and are secured to a bracket 27 which is rigid with the lower end of a vertically disposed crank shaft 28 journaled in the platform 5 and a transverse sill 29 secured to and extending between the front ends of the lower side beams 1. The upper end of this crank shaft is provided with a handle member 30 which extends rearwardly toward the driver's seat and is intended to be straddled by the driver so that, by shifting his feet slightly, the crank shaft will be actuated and the supports 26 swung to either side so that the scoops 24 and the plows 25 will be caused to follow the row of plants. Immediately in advance of the scoops or furrow formers 24, I secure to the supports 26 the hangers or brackets 31 which are preferably somewhat resilient and have bearings 32 formed on their free ends, in which bearings are journaled the axles 33 of cutting disks 34 which are disposed at an angle to the line of travel so that they will take into the earth and cut away the soil in advance of the plows, throwing the same to one side so that the plants will be uncovered. The disks or cutters 34 may be adjusted in their bearings so as to run close together or farther apart according to the size of the beets. Guide rods 35 are rigid with and extend rearwardly from the upper edges of the plows and similar guide rods 36 are secured to the supports 26 and extend rearwardly therefrom between and beyond the disks 34 and the scoops 24 above the plows and the guide rods 35, the purpose of these guides being presently more specifically referred to.

Figure 1:
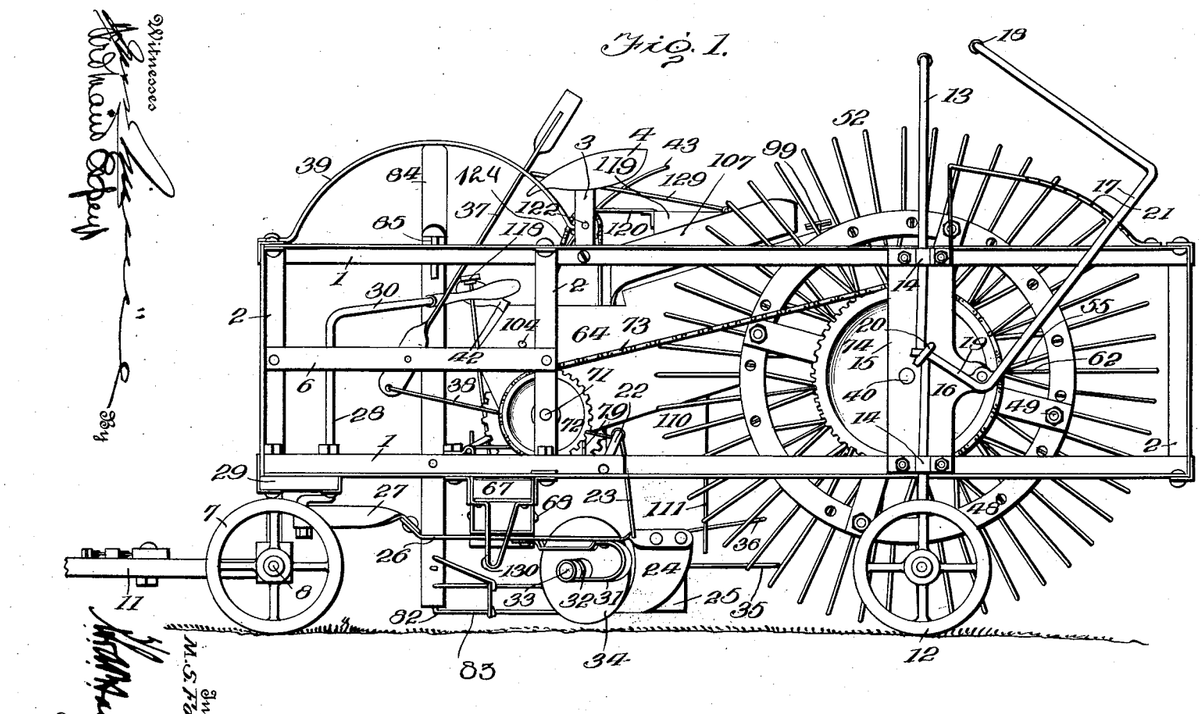
Figure 1 is a side elevation of the complete machine.
Figure 2:
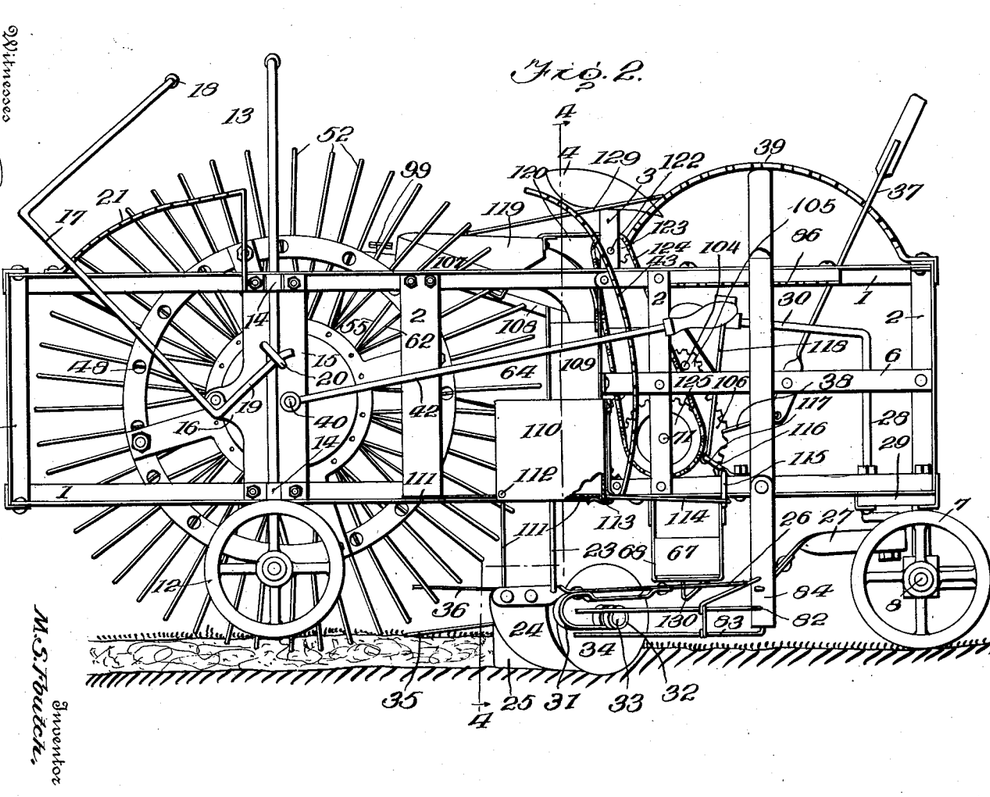
Fig. 2 is an elevation looking at the opposite side of the machine.
Figure 3:
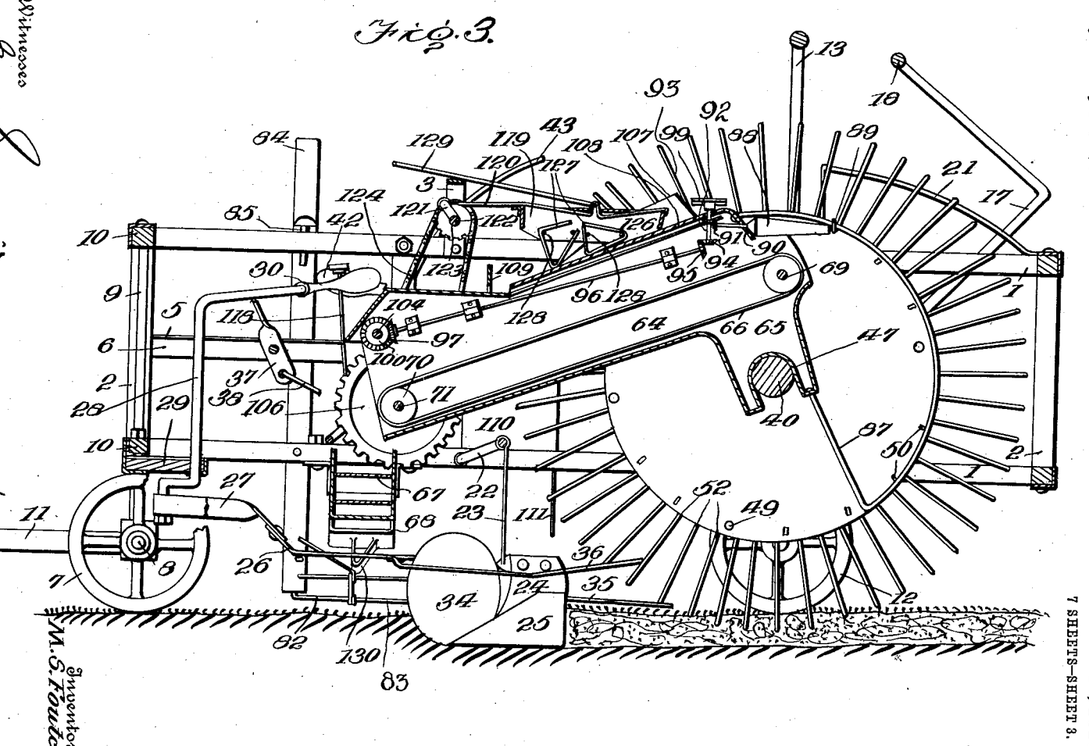
Fig. 3 is a longitudinal vertical section taken substantially through the center of the machine.

A lever 37 is fulcrumed upon the platform 5 and plays in a longitudinal slot therein so that the driver may readily vibrate the lever when necessary or desirable. The lower end of this lever is connected by a link 38 with the crank shaft 22 and it will thus be seen that when the upper end of the lever is thrown forward the crank shaft will be rocked rearwardly so that the disks or cutters, the plows and the scoops will be lowered as indicated in Fig. 3, whereas, when the upper end of the lever is swung rearwardly, the crank shaft will be rocked forward and the disks, the plows and the shovels or scoops will be raised to permit the machine to be moved from field to field. A segmental holding bar or rack 39 is secured upon the main frame at the front end thereof and is adapted to be engaged by the said lever 37 so that the lever and the parts connected therewith may be held in any set position.

Figures 6, 9:
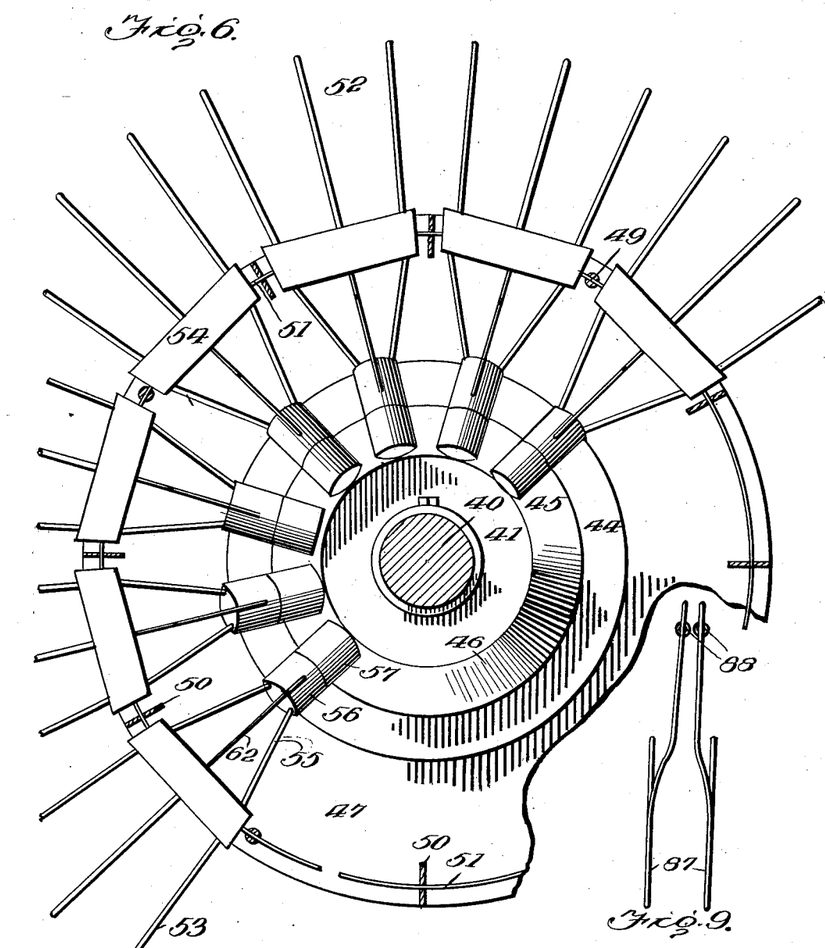
Fig. 6 is an enlarged elevation showing the inner face of one of the beet-engaging wheels with the vibratory fingers mounted thereon.
Fig. 9 is a detail end view of the pulling rollers and the guides leading thereto.

Journaled in and extending between the standards 15 is a shaft 40 having cam disks 41 secured rigidly thereto and spaced equally distant from its longitudinal center. A lever 42 is secured rigidly to one end of this shaft and extends forwardly adjacent the side of the main frame to a point where it may be easily manipulated by the driver in the seat 4. A substantially vertically disposed rack or holding bar 43 is provided on the adjacent side of the main frame to be engaged by the said lever and hold the same in any position to which it may be adjusted so that the said cams 41 may be adjusted to cause the beet-engaging fingers to open or close at the proper points to successfully take up the beets and deliver the same to the topping implements. The cams consist essentially of disks 44 secured rigidly to the shaft 40 and provided upon their outer faces with annular ribs 45 disposed concentric with the shaft and having a portion of their outer surface beveled or reduced, as indicated at 46. Loosely mounted upon the shaft 40 between the sides of the main frame and the longitudinal center thereof are wheels or annular frames consisting essentially of inner and outer annular members 47 and 48 spaced apart and joined at intervals by bolts 49 and by axially disposed bars or plates 50, an annular fulcrum rod 51 being threaded through the said bars 50 and the bolts 49, as shown most clearly in Fig. 6. The bolts 49 serve to secure the annular members 47 and 48 rigidly together, while the spacing bars 50 serve to maintain the spaced relation of the said members and also define spaces within which the beet-engaging fingers or levers may be mounted. The beet-engaging fingers 52 are disposed radially around the entire circumference of the gathering wheels consisting of the members 47 and 48. The beet-engaging fingers consist of rods 53 doubled upon themselves and having their doubled portions extending toward the central longitudinal plane of the machine. From the doubled portions the rods are curved outwardly and inwardly toward the gathering wheels and have their extremities diverging and secured to boxes or frames 54 which are pivotally mounted upon the rods or rings 51. From the inner edges of the said boxes 54, rods or wires 55 extend inwardly and converge so as to be joined by a cylindrical body 56 having a roller 57 mounted upon its inner end, the said roller 57 bearing against the annular cam rib 45, as clearly shown. The outer member of the gathering wheel is provided with a central enlargement or hub 58 and from the said hub a series of guide pins 59 extend axially inward and project over the outer annular face of the adjacent rib 45 at opposite sides of the rollers 57 so that the said rollers and the beet-engaging fingers with which they are connected will be held in the radial planes in which they are mounted. To maintain the engagement of the rollers 57 with the annular cam ribs 45 I employ a series of springs 60 which consist, in the illustrated arrangement, of a central coil 61 and arms 62 diverging therefrom, the extremity of one arm 62 being secured in the hub 58 or some other permanent portion of the outer member of the gathering wheel and the extremity of the other inner arm 62 being secured in the body 56 of the beet-engaging fingers, as shown.

Figures 7, 8:
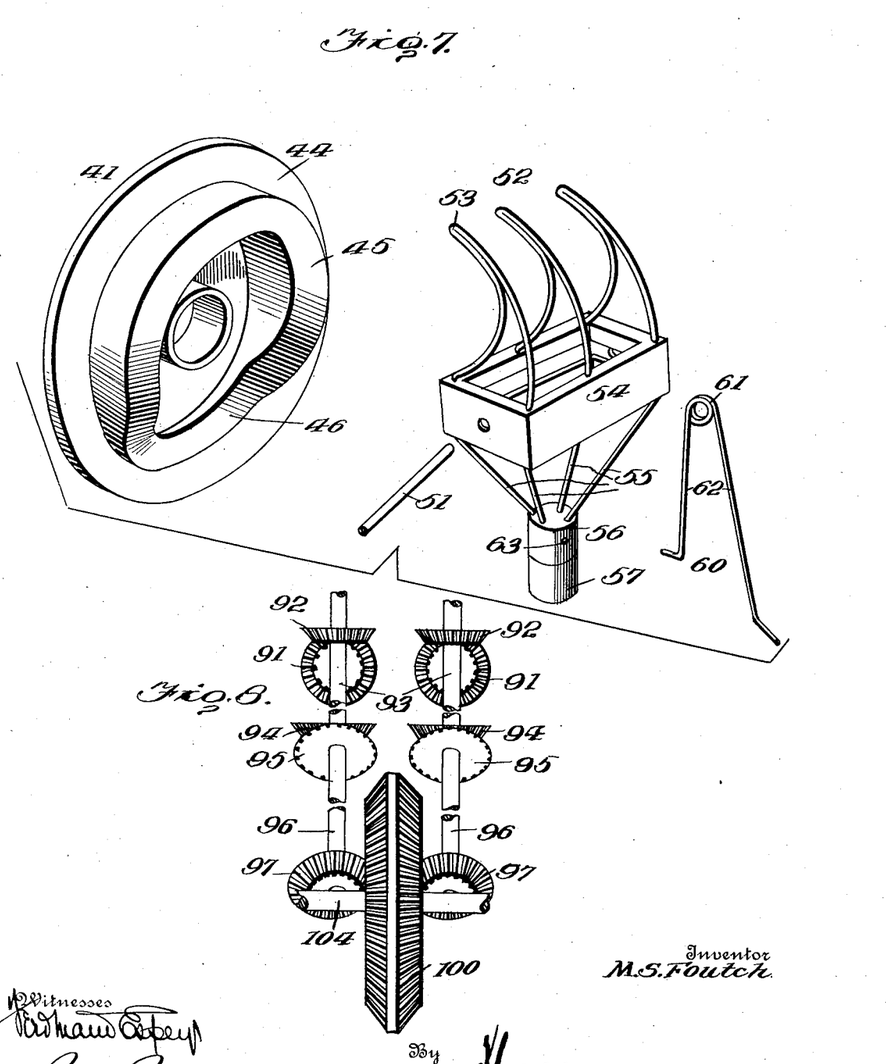
Fig. 7 is a detail perspective view showing one of the said fingers, the cam against which the fingers bear, and the spring by which the fingers are held in engagement with said cam.
Fig. 8 is an enlarged detail view of a portion of the gearing.

In Fig. 7, a socket or opening 63 is indicated in the body 56 to receive the end of the spring. It will be readily noted that I have shown a plurality of fingers 53 secured to each box or frame 54. By thus providing a plurality of fingers in each compartment or division of the gathering wheel, I more effectually engage the plants, but it will be understood, of course, that the exact number of fingers is immaterial provided the fingers are sufficiently close together to engage all the plants as the machine is drawn over the field and the entire circumference of the gathering wheel is provided with the engaging fingers. The shaft 40, as before stated, will be held stationary in the standards 15 and as the gathering wheels are loosely mounted on the said shaft they are free to rotate around the same and will be so rotated by the engagement of the beets and the fingers. As the wheels rotate about the shaft 40, the rollers 57 traveling upon the cam ribs 45 will be moved to and from the inner member of the gathering wheel under the combined influence of the springs 60 and the said cam ribs, as will be readily understood, and, as the said cams are similarly arranged, the opposed beet-engaging fingers will be moved toward each other as the rollers reach the high parts of the cams and will swing away from each other as the rollers travel on the lower parts of the cams. The cams will, of course, be so adjusted through the medium of the lever 42 that their high parts will be below and slightly in rear of the shaft 40, while the lower parts will be above and slightly in advance of the said shaft, thereby permitting the fingers to approach as they reach the row of plants and, consequently, causing them to firmly engage and hold the plants so that the continued rotation of the gathering wheels will cause the plants to be uprooted, and, as the plants reach the topping implements, the fingers will be moved away from each other so that the plants will be released.

A tubular casing or frame 64 is arranged along the central longitudinal plane of the machine and is provided at its rear end with a depending leg or bracket 65 which is fitted over the shaft 40, as clearly shown in Fig. 3, the front end of the said casing being supported by the platform 5 by having its upper portion resting directly upon the said platform, as also shown in said figure. An endless belt or conveyer 66 is arranged longitudinally within this casing to carry the tops separated from the beet bodies forwardly and deliver the same onto a transverse conveyer or endless belt 67 which is mounted in a suitable frame 68 adjacent the front end of the main frame and inclined downwardly toward one side of the same. The belt or conveyer 66 is trained around rollers 69 and 70 which are journaled in the sides of the casing 64 at the rear and front ends thereof, respectively, and the roller 70 is fast to a shaft 71 which extends through the sides of the casing 64 and is journaled in the intermediate posts 2 of the main frame. A sprocket wheel 72 is secured upon the said shaft 71 adjacent one end thereof and a sprocket chain 73 is trained around the said sprocket wheel and a larger driving sprocket wheel 74 which is fitted loosely upon the shaft 40 and connected rigidly with the outer member of the adjacent gathering wheel by bolts or similar devices 75. As the machine is drawn over the field, motion will be imparted to the sprocket wheel 74 which must follow the movement of the gathering wheels due to the engagement of the fingers 52 with the plants and, consequently, the sprocket wheel 72 will be actuated through the chain 73 so that the upper run of the conveyer 66 will travel toward the front end of the machine. The beet tops deposited upon said conveyer will, consequently, be delivered onto the conveyer 67 and, by the latter conveyer, will be delivered at the side of the machine, where they may be deposited directly upon the ground or caught in a receptacle mounted on the side of the machine or delivered onto a conveyer carried by a vehicle driven at the side of the harvesting machine so that they may be expeditiously gathered. Adjacent the sprocket wheel 72 a crown wheel 76 is mounted upon the shaft 71 and this crown wheel meshes with a spur pinion 77 on the upper end of a vertical stub-shaft 78 which is journaled in a bracket 79 secured upon a convenient part of the main frame. A bevel gear 80 is fixed upon the lower end of the shaft 78 and meshes with a similar gear 81 on the outer end of the upper roller of the conveyer 67 so that when the machine is in operation the upper run of the conveyer 67 will travel toward the delivery side of the machine.

I have illustrated the conveyer 67 as delivering into a basket or shelf 82 consisting of a series of rods 83 projecting rearwardly from the lower end of a lever 84 which is fulcrumed upon the main frame and projects upwardly at the side thereof to a point in advance of the seat 4, the said lever being provided on its side adjacent the frame with a locking rib 85 adapted to engage a rack or holding bar 86 on the side of the machine, as will be readily understood. The tops may be allowed to accumulate within the basket 82 until a considerable quantity has been delivered and the driver may then push rearwardly on the upper end of the lever 84 so that the basket will be tilted and the accumulated tops deposited upon the ground.

Secured to the opposite sides of the leg 65 at the rear end thereof are guide rods 87 which extend downwardly from the said leg 65 and diverge rearwardly to points adjacent the peripheries of the inner annular members 47 of the gathering wheels. The guide rods then extend upwardly and forwardly concentric with the peripheries of said members 47 and as they rise they approach each other so that the beet tops passing between the said guide rods will be bunched and will pass easily into the space between the pulling rollers 88. These rollers 88 are of an elongated conical formation with their smaller ends at the rear and mounted in suitable bearings 89 provided on the guide rods 87. The forward ends of the rollers are supported in the rear end of the top member 90 of the casing 64 and are equipped with pinions 91, which turn in opposite directions so that the rollers will be rotated toward each other and, consequently, will pull the tops downwardly toward the conveyer 66 so that they will drop onto said conveyer when severed from the beets. Motion is imparted to the pinions 91 by pinions 92 carried by vertical shafts 93 supported in suitable bearings on the side of the casing 64, the said shafts being equipped with pinions 94 at their lower ends. The pinions 94 mesh with pinions 95 on the rear ends of shafts 96 disposed longitudinally in the upper portion of the casing 64 and equipped with pinions 97 at their front ends. The vertical shafts 93 carry rotary cutters 99 on their upper ends, the parts being so arranged that the said cutters will be close to the inner ends of the rollers 88 and will cut across the stems of the beet tops so as to sever the same from the beet bodies. The pinions 97 mesh with the opposite faces of a double gear wheel 100 which is fixed upon a transverse shaft 104 journaled in and extending through the sides of the casing 64 at the front end thereof and equipped at one end with a pinion 105 meshing with the gear wheel 106 fixed upon the shaft 71.

Figure 4:
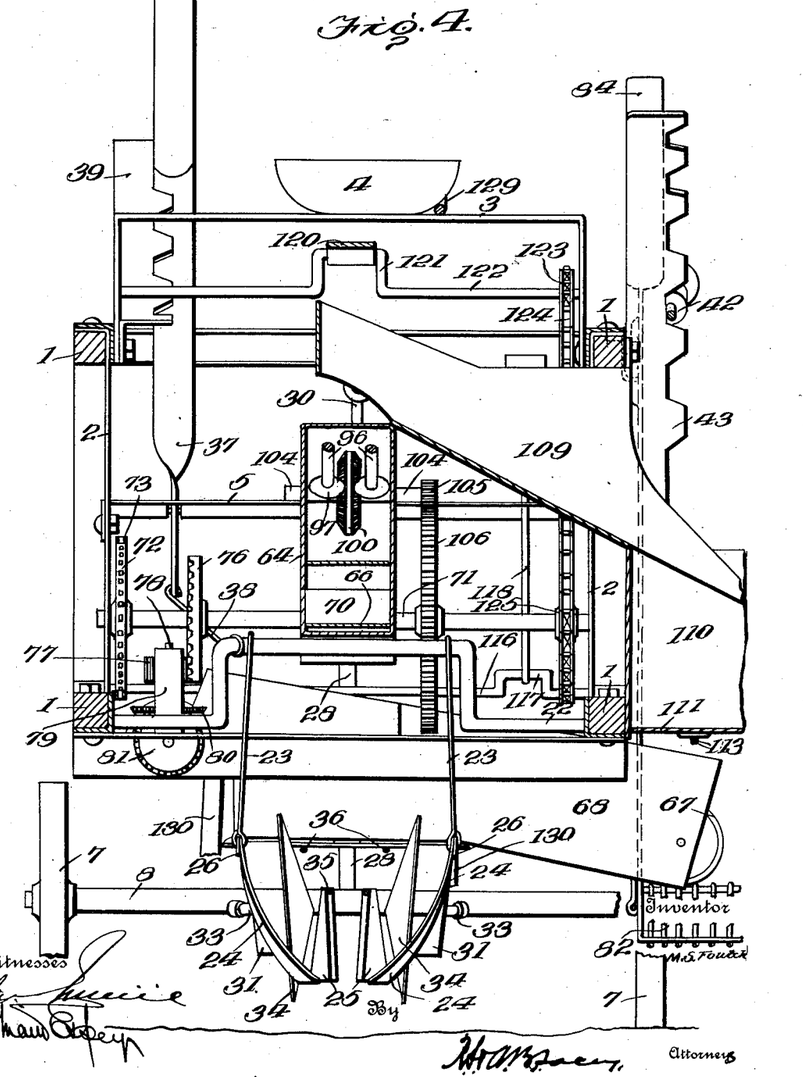
Fig. 4 is a transverse vertical section taken on the line 4—4 of Fig. 2.
Figure 5:
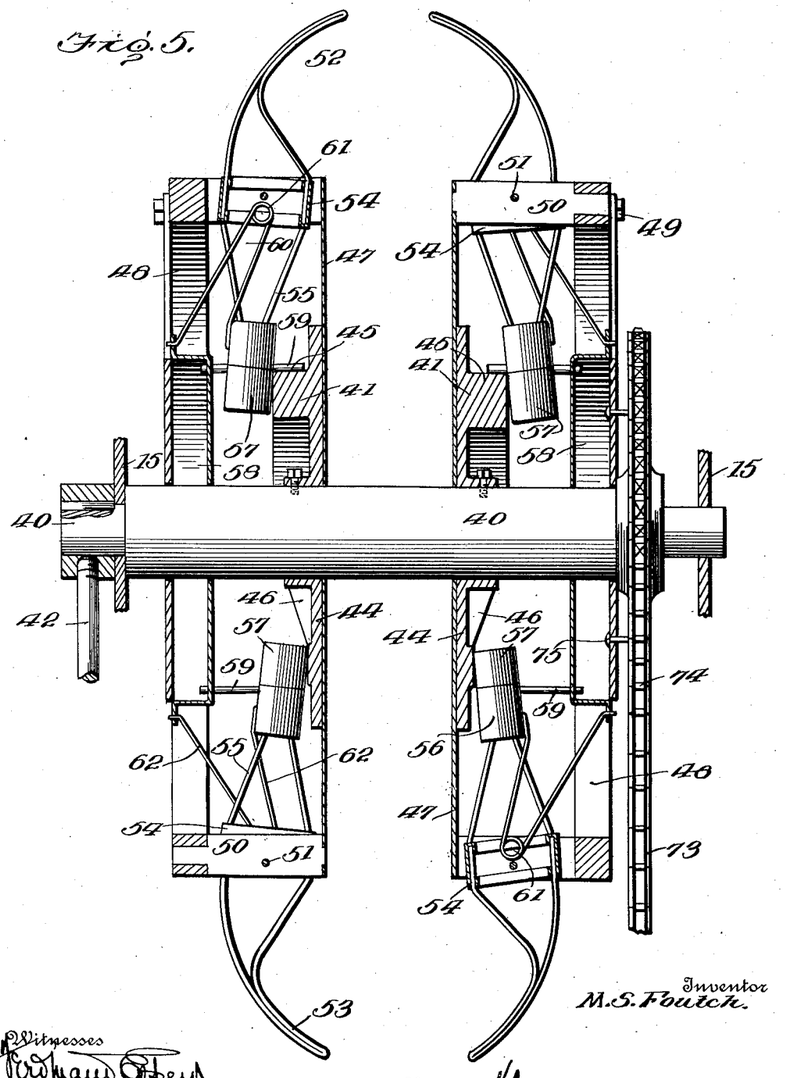
Fig. 5 is a diametrical section of the means for taking up the beets.

The cutter shafts 93, as before stated, are journaled in the top of the casing 64 and carry cutters 99 on their upper ends. The top of the casing is inclined downwardly and forwardly and upon the said downwardly and forwardly inclined top of the casing are secured substantially vertical side plates 107 which prevent the beets from dropping off the top at the side edges. The top 108 of the casing 64 constitutes a chute through which the beet bodies may gravitate, and at its forward extremity this top plate or chute delivers into a transverse chute 109 which extends downwardly to the same side of the frame as the conveyer 67 and is arranged above and in rear of said conveyer 67. The bottom of the chute 109 terminates at the side of the main frame, while the side plates of said chute project laterally beyond the frame, as shown most clearly in Fig. 4, so that the beets passing downwardly through the said chute will drop into a receptacle mounted upon the side of the frame or may be delivered upon a conveyer by which they will be carried into a vehicle driven alongside of the harvester. In the drawings, I have illustrated a box 110 secured upon the side of the frame and having a movable bottom. The said bottom is preferably constructed in multiple and consists of four shelves or plates 111 secured to and radiating from a shaft or pivot rod 112 which is journaled in and extends between the sides of the box so that, when beets are being delivered into the box, one of the said shelves or plates will extend to the closed front end of the box and be there supported by a spring latch 113. In this position, one of the shelves will extend vertically upward at the rear of the box to form a closure at that side therefor, while the other shelves will extend, respectively, downward and rearward from the box. The latch 113 may be of any convenient form, but is shown as a spring secured to the front side of the box and having its lower end extended under the box so as to support the free edge of the shelf which may be serving as the bottom for the box. A link 114 engages the latch near its lower end and extends forwardly therefrom to a depending crank arm 115 on a shaft 116 which is journaled upon the main frame and is provided with a cranked portion 117 between its ends, said cranked portion being engaged by a rod or pedal 118 extending upwardly through the platform 5 in convenient position to be pressed by the foot of the driver.

It will be readily seen that when the box has been filled with beets the driver may press downwardly upon the pedal 118, thereby rocking the shaft 116 so that the link 114 will be moved forwardly and the latch 113, consequently, withdrawn from under the free edge of the shelf which will then at once fall under the weight of the beets thereon so that the beets will be deposited upon the ground or delivered into some other container and a succeeding shelf will be brought into position to support the beets subsequently delivered by the conveyer 109. The beet bodies will tend to travel downwardly over the top plate 108 under the influence of gravity, but this travel may be facilitated by a feeder 119. Such feeder consists of a body or block carried by the ends of arms 120 pivoted upon and projecting rearwardly from the crank 121 of a shaft 122 which is journaled in the bracket 3 and extends transversely of the machine. A sprocket pinion 123 is fixed upon the said shaft 122 at one end of the same, and a sprocket chain 124 is trained around said pinion and a sprocket wheel 125 fixed on the shaft 71 at the side opposite the sprocket wheel 72. A reciprocatory movement will thus be imparted to the block or body 119 so that it will be alternately moved in opposite directions along the top plate 108 and the rear end of the said block or body is beveled, as indicated at 126, so that upon the rearward travel of the body it will ride easily over the beet bodies which may then be upon the top plate. Upon the forward movement of the body, feeders 127 carried thereby will engage the beet bodies and push the same along the top plate to and into the chute 109. These feeders may be of any preferred construction, but I have illustrated them as consisting of plates bent into triangular form and pivoted at one angle within the body, the plates being extended forwardly from their pivots and having one angle below the body and the remaining angle in position to be engaged by stop pins or rods 128 disposed transversely within the body. Upon the rearward movement of the body, these feeders will swing up into the body to clear the beets, but on the forward movement of the body they will drop into engagement with the beets so as to positively feed them into the delivery chute. The feeder may be raised from the top plate 108 by means of a lifter 129 which is pivoted to the top of the body and extends over and rests upon the bracket 3 with its end adjacent the seat 4. If the beets are traveling through the chutes with sufficient rapidity, the feeder may be held upward in such position that it will not engage the beets, but, should the beets tend to accumulate in the chutes so as to clog the action, the feeder may be lowered so as to cause the beets to positively travel to the point of delivery.

It is thought the operation and advantages of the machine constructed in accordance with my invention will be readily understood. The machine is drawn over the field along the row of plants and as it travels the disks 34 will cut into the earth at the sides of the row so as to turn aside the dirt which is packed around the plants. Immediately in rear of these disks the scoops or furrow-forming devices travel so as to enlarge the furrow partly formed by the said disks and expose the plants so that they may be readily engaged by the fingers 52 traveling in the furrow. The plows 25 will travel close to the sides of the beets so that the dirt packed immediately against the beets will be effectually cut away and a clean exposure of the beet bodies effected. The front beveled ends of the plows will also take under the drooping beet tops so that they will be lifted as the plows move forward and will be directed to and between the guides 35 and 36 by which they will be compressed so that they will enter readily into the space between the uprooting fingers. The fingers 52 being caused to travel in the furrow immediately in rear of the plows will be disposed at opposite sides of the beets and through the action of the cams and springs hereinbefore specifically described they will close around the beets, and, as the machine moves forwardly will exert a pulling force upon the beets so as to uproot them. The uprooted beets will be firmly held by the fingers and will be carried around to the pulling rollers 88 which they will approach in an inverted position. As the beets are carried upwardly by the fingers 52, the beet tops will pass between the guides 87 and will be compressed so that they will enter readily between the pulling rollers 88 and as the opposed surfaces of these rollers are moving downwardly they will exert a tendency to pull the beet tops from the beet bodies. The fingers, however, will not yet release the beets, but will continue to engage the same and move them forward to the cutters 99 which will effectually sever the beet tops from the bodies. The fingers will then release the beets which will travel through the chutes and be delivered at the side of the machine, while the severed tops will drop upon the conveyer 66 and be separately delivered at the side of the machine, as before stated. It will thus be seen that the beets will be automatically taken out of the ground and delivered into suitable receptacles free of their tops without any attention upon the part of the driver who is called upon merely to drive the draft animals and steer the same so as to keep the machine in position over the row of plants. The lateral movement of the supports 26 and the uncovering and furrow-forming instrumentalities carried thereby is not excessive and is intended to be only sufficient to keep said implements in proper position relative to the row of plants notwithstanding any slight irregularities in the movement of the machine as an entirety. To prevent excessive movement of the said parts, stops 130 are provided on the bottom of the conveyer casing 68 at opposite sides of the support 26.

It is to be understood that the details of construction herein disclosed are illustrative only and not restrictive and that various changes may be made in the minor details without involving any departure from the spirit or scope of the invention as the same is defined in the following claims.

What I claim is:—

1. A beet harvester comprising rotatable gathering wheels, plant engaging fingers carried by said wheels, means for causing said fingers to engage and release the plants, and means for varying the point of such engagement and release of the plants by the fingers.

2. In a machine for the purpose set forth, the combination of a main frame, a shaft mounted in said frame, gathering wheels loosely fitted on said shaft, plant-engaging fingers carried by said wheels, cams fixed upon the said shaft and acting on said fingers to cause them to engage and release the plants, and means for shifting the said shaft and the cams whereby to vary the point of engagement and release of the plants.

3. In a machine for the purpose set forth, the combination of a main frame, rotatable gathering wheels mounted in said frame, plant-engaging fingers mounted within and projecting from said wheels, cams housed within said wheels and carried by the main frame and acting on said fingers to cause them to engage and release the plants, and means housed within the wheels for maintaining the engagement between the fingers and the cams.

4. In a machine for the purpose set forth, the combination of a main frame, gathering wheels rotatably mounted therein, plant-engaging fingers pivotally mounted within the said wheels and projecting from the periphery thereof, cams housed within the wheels and acting on said fingers, and springs housed within and secured to the wheels and acting on the fingers in opposition to said cams.

5. In a machine for the purpose set forth, the combination of a main frame, gathering wheels rotatably mounted therein and each comprising annular members and spacing devices extending between said members, a pivot member extending through said spacing devices, plant-engaging fingers mounted on said pivot member between said spacing devices, and cams acting upon said fingers to cause them to engage and release the plants.

6. In a machine for the purpose set forth, the combination of a main frame, gathering wheels rotatably mounted in said frame and comprising annular members and spacing devices between said members, plant-engaging fingers pivotally mounted between said spacing devices, cams within the gathering wheels, cam-engaging bodies secured to the inner ends of the fingers, and means for holding said bodies in engagement with the cams.

7. In a machine for the purpose set forth, the combination of a main frame, gathering wheels rotatably mounted in the main frame and consisting of annular bodies and spacing devices extending between said bodies, plant-engaging fingers pivotally mounted between said spacing devices, cams within the gathering wheels, cam-engaging bodies connected with the fingers, means for holding said bodies in engagement with the cams, and axially extending guides within the gathering wheels at opposite sides of said bodies.

8. In a machine for the purpose set forth, the combination of a main frame, gathering wheels rotatably mounted therein and consisting of annular bodies and spacing devices connecting the same, a fulcrum member extending through said spacing devices, boxes pivotally mounted on said fulcrum member between the spacing devices, plant-engaging fingers extending outwardly from said boxes, cams within the gathering wheels, cam-engaging bodies connected to the inner edges of said boxes, and springs secured in the gathering wheels and bearing against said bodies in opposition to the cams.

9. In a machine for the purpose set forth, the combination of a pair of gathering wheels, pulling rollers mounted between the wheels above the axis thereof, and means for rotating said rollers in opposite directions.

10. In a machine for the purpose set forth, the combination of a pair of gathering wheels, guides arranged between the wheels and approaching each other above the axis of the wheels, and conical pulling rollers supported by the upper portions of said guides.

11. The combination of a pair of gathering wheels, pulling rollers disposed between the gathering wheels, cutters arranged adjacent the pulling rollers, and connections whereby the rollers and the cutters will be actuated by the gathering wheels.

12. The combination of a pair of gathering wheels, pulling rollers disposed between the gathering wheels, cutters arranged adjacent the pulling rollers, means for conveying material from the cutters and the rollers, and connections whereby said conveying means, the rollers and the cutters will be actuated by the gathering wheels.

13. The combination of gathering wheels, cutters co-acting with said wheels, a feeder to move plants from the cutters, and means whereby said feeder and the cutters will be actuated by the gathering wheels.

14. The combination of a pair of gathering wheels, top-pulling members arranged between the wheels, and means for operating said members.

15. The combination of a pair of gathering wheels, top-pulling members between the wheels, and a cutter adjacent said members.

16. The combination of a pair of gathering wheels, top-bunching guides arranged between the wheels, and top-pulling members arranged between the wheels immediately adjacent the discharge ends of the guides.

17. The combination of a pair of gathering wheels, top-bunching guides arranged between the wheels, top-pulling members arranged between the wheels immediately adjacent the discharge ends of the guides, and a cutter arranged to act on the tops as they leave said pulling members.

In testimony whereof I affix my signature in presence of two witnesses.

MILLARD S. FOUTCH. [L. S.]

Witnesses:
N. P. McDonald,
Emma Wolford.

Copies of this patent may be obtained for five cents each, by addressing the "Commissioner of Patents, Washington, D. C."